US00RE34536E

United States Patent [19]

Frimmel, Jr.

[11] E Patent Number: Re. 34,536

[45] Reissued Date of Patent: Feb. 8, 1994

[54] CALL MANAGEMENT SYSTEM WITH PROTOCOL CONVERTER AND PORT CONTROLLER

[75] Inventor: James J. Frimmel, Jr., Pacifica, Calif.

[73] Assignee: International Telesystems Corporation, Herndon, Va.

[21] Appl. No.: 545,058

[22] Filed: Jun. 28, 1990

Related U.S. Patent Documents

Reissue of:

[64] Patent No.: 4,817,130
Issued: Mar. 28, 1989
Appl. No.: 938,405
Filed: Dec. 5, 1986

U.S. Applications:

[63] Continuation-in-part of Ser. No. 905,959, Sep. 11, 1986, abandoned.

[51] Int. Cl.[5] ..... H04M 1/26

[52] U.S. Cl. ..... 379/88; 379/216; 379/218

[58] Field of Search ..... 379/69, 84, 88, 89, 379/67, 92, 216, 218

[56] References Cited

U.S. PATENT DOCUMENTS

| | | | |
|---|---|---|---|
| 3,989,899 | 11/1976 | Norwich | 379/134 |
| 4,071,698 | 1/1978 | Barger, Jr. et al. | 379/84 |
| 4,577,062 | 3/1986 | Hilleary et al. | 379/88 |
| 4,599,493 | 7/1986 | Cave | 379/247 |
| 4,600,814 | 7/1986 | Cunniff et al. | 379/94 |
| 4,653,085 | 3/1987 | Chan et al. | 379/94 |
| 4,656,623 | 4/1987 | Dalby, Jr. et al. | 370/60 |
| 4,656,624 | 4/1987 | Collins et al. | 370/60 |
| 4,677,609 | 6/1987 | Piereth et al. | 370/60 |

OTHER PUBLICATIONS

"The AT&T Multi-Mode Voice Systems-Full Spectrum Solutions for Speech Processing Applications", S. D. Hester et al., *Proceedings of the 1985 AVIOS Conference*, Sep. 1985 (12 pages).

*Primary Examiner*—Thomas W. Brown
*Attorney, Agent, or Firm*—Whitham & Marhoefer

[57] ABSTRACT

A call management system takes records from a mainframe computer. A protocol converter converts the synchronous data output from the mainframe computer for use on asynchronous terminals. Parallel port controllers are connected to the protocol converter, and asynchronous terminals are connected to the port controllers. A local processor controls the connection of the terminals to the local procesor or to the mainframe system by sending special function codes during transmissions from the local processor. Each terminal has a special function key downloaded from the local processor which enables the terminal to switch the connection back from the host mainframe to the local processor. The protocol converter converts asynchronous signals to synchronous signals to address and update records in the main frame computer storage. The local processor controls call progress tone recognition apparatus and voice recorder or synthesizer apparatus and timing apparatus and automatic dialing apparatus for controlling a line control unit which provides DTMF signals to a local switching means and trunks leading from the exchange to dial individual numbers, recognize call progress tones and voice, begin a speech reproduction message on an answered line and switch the line to an operator's station upon completion of the message.

19 Claims, 2 Drawing Sheets

CALL MANAGEMENT SYSTEM WITH PROTOCOL CONVERTER AND PORT CONTROLLER

Matter enclosed in heavy brackets [ ] appears in the original patent but forms no part of this reissue specification; matter printed in italics indicates the additions made by reissue.

BACKGROUND OF THE INVENTION

This is a continuation-in-part of application Ser. No. 905,959, filed Sep. 11, 1986, now abandoned.

The present invention relates to call management systems and particularly to systems having local processors and private exchanges which display call information on operators' terminals and connect voice lines to the operators' stations for predialed calls as operators become available.

Telemarketing systems or call management systems sequentially select telephone numbers, capture a line, generate DTMF signals, supply the signals to the line and listen for call progress tones such as a busy signal or ringing as well as presence of human voice. Upon an indication that a telephone has been answered, such as in the absence of such tones, or when human voice is detected, the system starts a selected stored message, and transfers the call to a station operator upon the completion of the message. At the same time, the system displays the caller record at the operator's terminal.

A need exists to permit such a system to interface with a mainframe computer for retrieving stored records of persons to be called and for updating the records with operator and local processor control, using the preferred synchronous, full-screen mainframe protocols.

SUMMARY OF THE INVENTION

A call management system takes records from a mainframe computer. A protocol converter converts the SNA/SDLC standard IBM communications protocol, or other synchronous data output from the mainframe for use on asynchronous terminals. A number of port controllers are connected to the protocol converter in parallel and three asynchronous terminals are connected to each port controller. A local processor controls the connection of the terminals to the local processor or to the mainframe system by sending special function codes during transmissions from the local processor to a terminal. Each terminal has a special programmed function key downloaded from the local processor which enables the terminal to switch the connection back from the host mainframe to the local processor. The protocol converter converts asynchronous signals to synchronous signals to address and update records in the mainframe computer storage.

The line control unit contains call progress tone recognition apparatus and audio record/playback apparatus and timing apparatus and automatic dialing apparatus, which provides DTMF signals through a telephone switching means to trunks leading from the local switching means to dial individual numbers, recognize call progress tones or voice, begin playback of a message on an answered line and switch the line to an operator's station upon completion of the recorded message.

A call management system apparatus according to the present invention has a local switching means, plural truck lines connected to the local switching means and a line control unit (LCU). Plural lines are connected between the line control unit and the local switching means. Plural lines are connected between the operator stations and the line control unit. A control line is connected between the local processor and the line control unit for controlling the line control unit. A peripheral line is connected between the local processor and a printer or other peripheral device. Plural ports are connected to the local processor. Plural terminals are located at the plural stations. Plural terminal lines are connected between the terminals and a port controller. Plural processor port lines are connected between the port controller and the local processor. Plural data lines are connected between the protocol converter and the port controller. A multiplexed data line is connected between the mainframe computer and the protocol converter.

In the preferred call management system apparatus, the line control unit has means for switching communication lines between the local switching means and the station lines.

Preferably, the local processor controls switching by the LCU.

In the preferred call management system apparatus, the LCU has digital voice record/playback means for recording and playing back a message over the trunk lines.

Preferably, the port controller controls connections of the terminal lines to the data lines between the port controller and the protocol converter and to the processor lines between the port controller and the local processor.

Preferably, the protocol converter converts asynchronous terminal input to SNA/SDLC or binary synchronous signals for use by the mainframe computer.

In the preferred call management system apparatus, the protocol converter converts synchronous data output sent from a mainframe computer to an asynchronous terminal input, and vice versa.

One embodiment of a preferred call management system apparatus has a number of port controllers and a protocol converter, plural data lines connected between the protocol converter and the port controllers and a data link for connecting the protocol converter to a mainframe computer. Plural processor lines connect the port controllers to a local processor, and plural terminal lines connect the port controller to plural terminals. The processor controls connections between the mainframe computer, the protocol converter, the port controllers and the local processor, and the processor controls the connections between the local processor, the controller and the terminals.

The preferred call management system apparatus further has a line control unit connected to the local processor, plural station lines connected to the LCU, local switching means, plural lines connected between the local switching means and the LCU and plural trunk lines connected to the local switching means.

In one preferred call management system apparatus, the local processor has means for playing a recorded message for providing voice signals to the LCU and thus to the called party. The local processor has DTMF signal generation means for generating DTMF signals and providing DTMF signals to the LCU. The local processor has tone recognition means for recognizing tones from lines connected to the LCU. The local processor has timing means connected to the LCU for starting and timing a message from the digital playback unit and for controlling the connection of the lines to the station lines following the message time interval.

In the preferred call management system apparatus of the present invention, the local processor has means for controlling the port controllers to control connection of the terminals to the local processor or to the protocol converter.

Preferably, in the call management system apparatus, the local processor has means for sending special function codes to the terminals, and the terminals have function keys enabled by said means to switch the port controllers connections back from the protocol converter to the local processor.

Preferably, the port controllers have a port controller for each terminal, local processor serial port, and protocol converter serial port. Each port controller is connected to the protocol converter, to the local processor and to terminals.

The preferred call management system method provides control signals from asynchronous terminals through terminal lines to port controllers, provides control signals from the port controllers through processor lines to a local processor, sends control signals from the local processor through the lines to the port controllers and sends control signals from the port controllers through data lines to a protocol converter. Control signals are converted in the protocol converter from asynchronous terminal signals to synchronous data signals. The data signals are sent to a mainframe computer via a data link. The local processor switches the port controller here. Records signals are sent from the mainframe computer via the data link to the protocol converter, which converts the records signals from synchronous signals to asynchronous terminal signals containing records information. The signals containing records information are sent via the data lines to the port controllers. The records information signals flow to the asynchronous terminals via the terminal lines.

The preferred call management system method controls the terminals with the local processor to connect the terminals through the port controllers to the protocol converter and controls the terminals with the local processor to enable the terminals to switch the connection back from the protocol converter to the local processor.

These and other and further objects and features of the invention are apparent in the disclosure which includes the specification with the above and ongoing description and claims and the drawings.

DETAILED DESCRIPTION OF THE DRAWINGS

Figure 1:
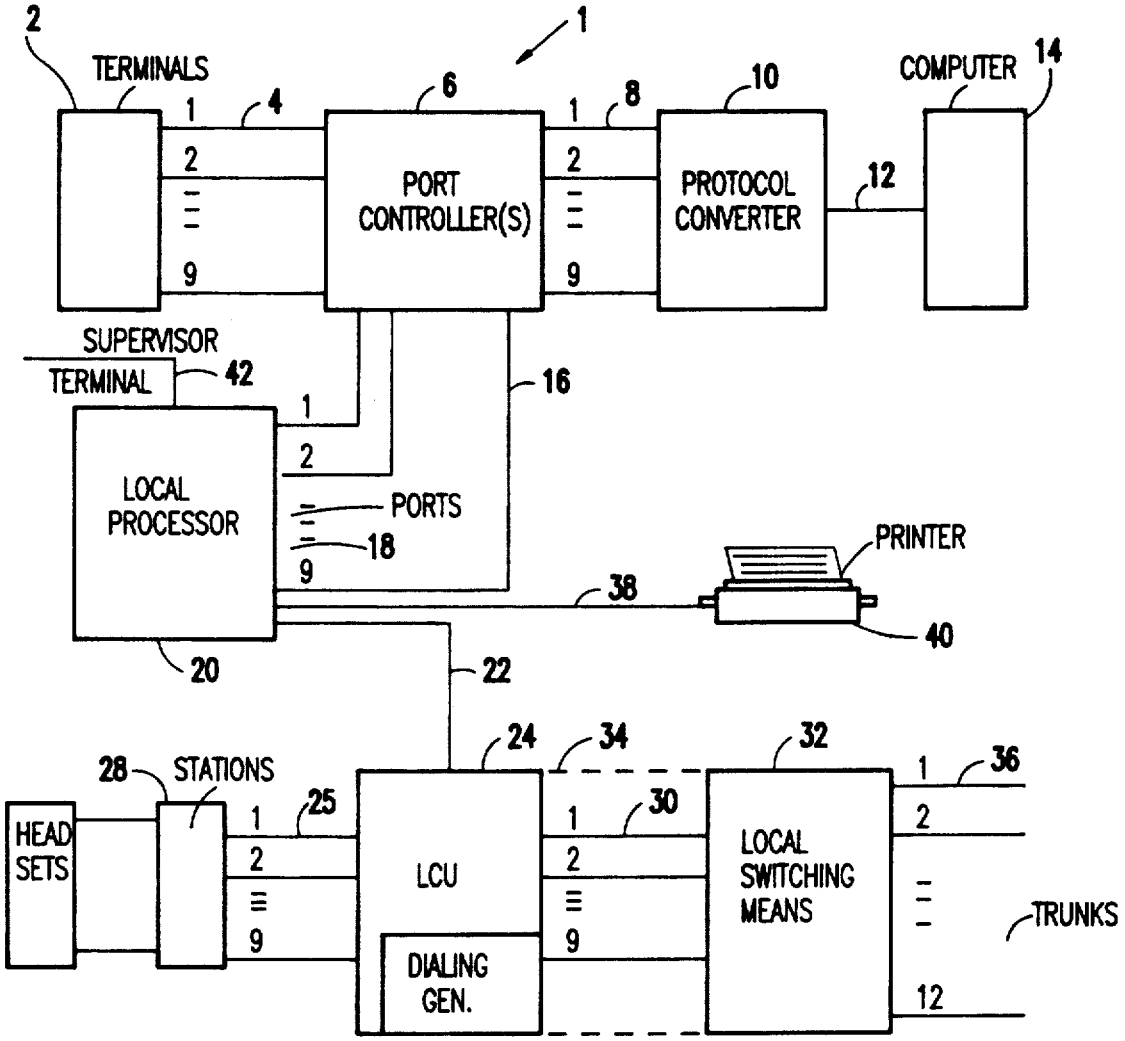
FIG. 1 is an overall schematic of the call management system of the present invention.

Referring to FIG. 1, a call management system is generally indicated by the numeral 1. Terminals 2 are connected by a plurality of terminal lines 4 to port controllers 6. Port controllers 6 are connected by a like plurality of data lines 8 to a protocol converter 10. Protocol converter 10 is connected by a data link 12 to a mainframe computer 14. Port controllers 6 is also connected by processor lines 16 to serial ports 18 of local processor 20. Processor 20 is connected by a control line 22 to line control unit 24. A plurality of station lines 26 are connected to operator headsets which include earphones and microphones at stations 28, where terminals 2 are located. The line control unit 24 is connected via a similar plurality of lines 30 to a local switching means 32 which is connected to external trunks 36. Preferably, the line control unit 24 and the local switching means are integrated in a single control and switching unit 34 as shown in dashed lines.

Preferably, line control unit 24 has DTMF dialing tone generators; call progress tone and voice recognition means for recognizing ringing, busy, intercept and other tones and voice to recognize when a phone has been answered. The preferred line control unit also has voice recording and reproducing means for storing and delivering messages.

Figure 2:
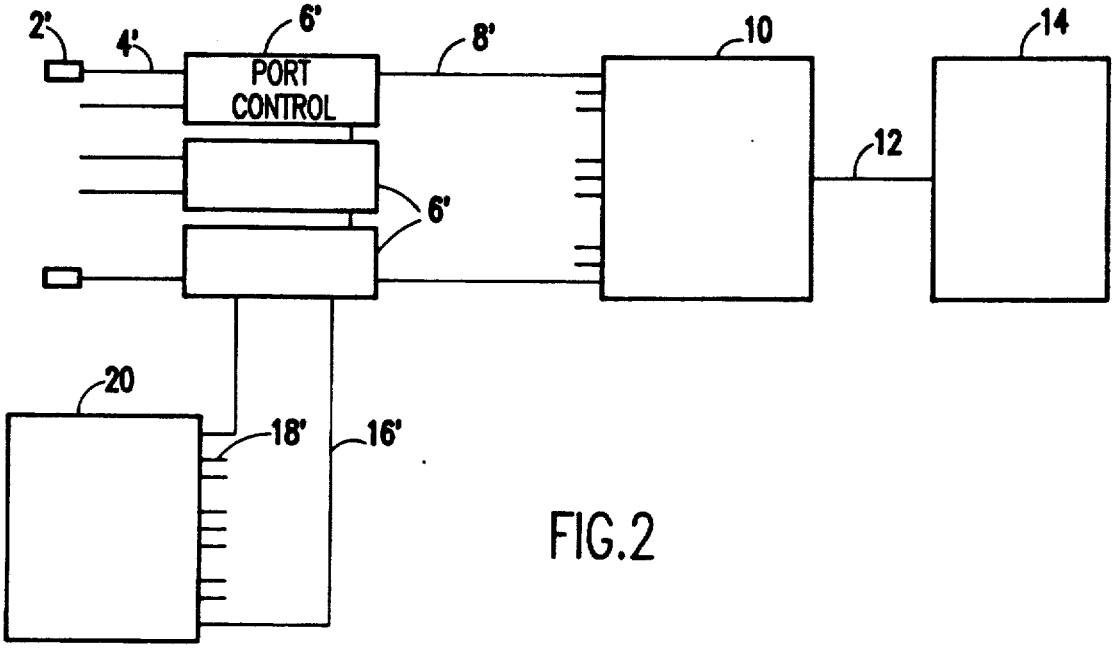
FIG. 2 is a schematic detail of the three port controllers.

As shown in FIG. 2, the preferred port controllers 6 are constructed of a number of parallel connected port controllers 6', each of which is connected via terminal lines 4' to terminals 2'. Data lines 8' connect each port controller 6' to the protocol converter 10. Processor lines 16' connect each port controller 6' to local processor 20.

Figure 3:
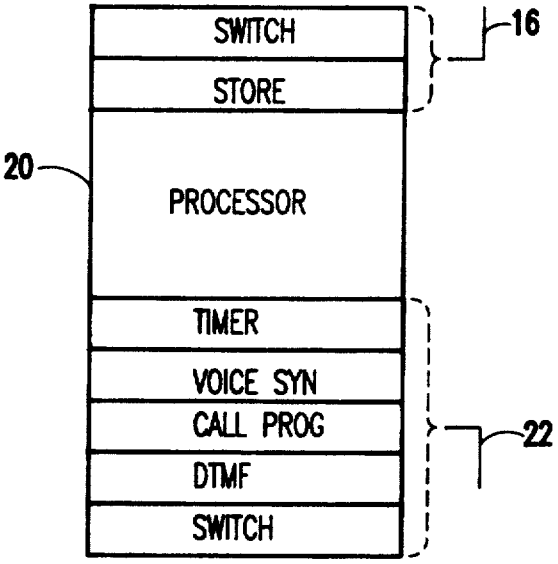
FIG. 3 is a schematic detail of parts and functions of the local processor.

As shown in FIG. 3, the local processor 20 has storage, switching and processing functions which flow information to and control the port controllers and the terminals and the protocol converter and which receive information and control signals from the terminals and which receive information signals from the protocol converter.

In the preferred embodiment of the invention, as shown in FIG. 1, a supervisory terminal 42 is connected to the local processor 20 and a peripheral line 38 connects a peripheral device 40, in this case a printer, to the processor.

The particular combination of the equipment used in the present invention makes the protocol converter look like a cluster controller and makes asyncrhonous start/stop terminals seem like and operate like more complex and expensive binary synchronous terminals such as IBM 3271's.

The present system may be used directly with a mainframe computer such as an IBM 370 and may, under the control of the local processor and the operators' terminals, take stored records directly from the mainframe computer, use those records to call customers and update those records all with easy standard connections.

The port controllers and the protocol converter are standard, off-the shelf items. The port controller allows any one of the terminals, the local processor and the protocol converter to be connected to any other at a given time. The protocol converter acts as a switch device to control three-way connections under programmed control or operational connection between any one device and any other connected device.

The protocol converter is used to convert synchronous data output sent from an IBM mainframe for use on an asynchronous terminal. The converter also converts asynchronous terminals input signals to synchronous signals to properly interface with the host mainframe computer system. The unit chosen allows for up to nine different asynchronous terminals and handles up to 19.2 kilobytes per second synchronous data sent to the host. The port controllers and preferably each of the port controllers provide connections from terminals to either ports on the local processor or the protocol converter or from the local processor to the protocol converter. The local processor controls the connections of the terminals to the processor or to the mainframe computer by sending special function codes during the transmission from the local processor to the terminals. Each terminal has a special function key. A signal downloaded to a terminal enables the terminal to switch the connection back from the mainframe computer host to the local processor.

While the invention has been described with reference to specific embodiments, modifications and variations of the invention may be constructed without departing from the scope of the following claims.

I claim:

1. Call management system apparatus comprising local switching means, plural trunk lines connected to the local switching means, a line control unit, plural lines connected between the line control unit and the local switching means, plural operator stations and plural lines connected between the operator stations and the line control unit, a local processor, a control line connected between the local processor and the line control unit for controlling the line control unit, a peripheral device and a peripheral line connected between the local processor and the peripheral device, plural serial ports connected to the local processor, plural [terminal] *terminals* one each respectively at the plural stations, port controllers, plural terminal lines connected between the terminals and the port controllers, plural processor lines connected between the port controllers and the ports of the local processor, protocol converting means, plural data lines connected between the protocol converting means and the port controllers, and a data line for connection between a mainframe computer and the protocol converting means.

2. The call management system apparatus of claim 1 wherein the line control unit has message announcement means and the line control unit has means for switching trunk lines between operators' stations and message announcement means.

3. The call management system apparatus of claim 2 wherein the local processor includes means that controls switching by the line control unit.

4. The call management system apparatus of claim 1 wherein the local processor has digital voice recording and playback control means for reproducing a message over the trunk lines.

5. The call management system apparatus of claim 1 wherein the port controllers control connections of the terminal lines to the data lines between the port controllers and the protocol converting means and to the lines between the port controllers and the local processor.

6. The call management system apparatus of claim 5 wherein the port controllers control the connection of the lines between the local processor and the port controllers and the terminal lines.

7. The call management system apparatus of claim 1 wherein the protocol converting means converts synchronous output sent from a mainframe computer to an asynchronous terminal input.

8. The call management system apparatus of claim 7 wherein the protocol converting means converts asynchronous terminal input to synchronous signals for use by a mainframe computer.

9. Call management system apparatus comprising port controllers and a protocol converting means, plural data lines connected between the protocol converting means and the port controllers and a data link connected to the protocol converting means for connecting the protocol converting means to a mainframe computer, plural processor lines connected to the port controllers for connecting the port controllers to a local processor and plural terminal lines connected to the port controllers for connecting the port controllers to plural asynchronous terminals, whereby the local processor controls connections between a mainframe computer, the protocol converter, the port controllers and the local processor and whereby the local processor controls connections between the local processor, the port controllers and the asynchronous terminals.

10. The call management system apparatus of claim 9 further comprising a line control unit (LCU) connected to the local processor, plural station lines connected to the LCU, a local switching means connected to the local LCU and plural trunk lines connected to the local switching means.

11. The call management system apparatus of claim 10 wherein the local processor has control means for digital recording and playback for providing voice signals from the LCU and wherein the local processor has DTMF signal generation and control means for controlling generating of DTMF signals and providing DTMF signals from the LCU, and wherein the local processor has tone recognition control means for controlling recognizing tones from the LCU and wherein the local processor has timing control means connected to the LCU for controlling the connection of the trunk lines to the station lines following a time interval during which a message is played.

12. The call management system apparatus of claim 1 wherein the local processor has means for controlling the port controllers to control connection of the terminals to the local processor or to a protocol converter.

13. The call management system apparatus of claim 1 wherein the port controllers comprise parallel connected port controllers and wherein each port controller has plural connections to a protocol converter, to the local processor and to terminals.

14. The call management system apparatus of claim 1 wherein the port controllers comprise parallel connected port controllers and wherein each port controller is connected to a protocol converter, to the local processor and to terminals.

15. A call management method comprising the steps of providing control signals from asynchronous terminals through terminal lines to port controllers, providing control signals from the port controllers through processor lines to a local processor, sending control signals from the local processor through the processor lines to the port controllers and sending control signals from the port controllers through data lines to a protocol converter, converting control signals in the protocol converter from asynchronous terminal signals to synchronous data signals, sending the data signals to a mainframe computer via a data link, sending records signals from the mainframe computer via the data link to the protocl converter, converting the records signals from synchronous signals to asynchronous terminal signals containing records information, sending the signals containing records information via the data lines to the port controllers, sending the records information signals to the local processor via the port lines, sending the records information signals from the local processor to the port controllers via the processor lines and sending the records information signals to the terminals via the terminal lines.

16. The call management system of claim 15 further comprising controlling the terminals with the local processor to connect the terminals through the port controllers to the protocol converter and controller the terminals with the local processor to enable the terminals to switch the port controllers connection back from the protocol converter tot he local processor.

17. The call management system of claim 15 further comprising sending records from the local processor to the mainframe computer via the port controllers and protocol converter.

*18. A call management system comprising in combination:*

*a host processor storing customer records;*

*a local processor storing data from customer records including telephone numbers to be dialed;*

*dialing means selectably connectable to a plurality of telephone trunks for placing an outgoing call by dialing one of said telephone numbers on one of said trunks;*

*a plurality of operator stations, each operator station comprising a data terminal for displaying and inputting customer record data and audio communication means;*

*trunk switching means for selectively connecting a selected one of said trunks to a selected one of said audio communications means; and*

*switching means for: (a) coupling said local processor and said host processor to transfer customer record data from said host processor to said local processor; (b) coupling said local processor to each of said data terminals to transfer customer record data from said local processor to each of said data terminals; and (c)* coupling each of said data terminals to said host processor to transfer customer record data updates from each of said data terminals to said host processor.

*19. A call management system comprising in combination:*

*a host processor storing customer records, said host processor employing a first protocol for transmitting and receiving data;*

*a local processor storing data from customer records including telephone numbers to be dialed, said local processor employing a second protocol for transmitting and receiving data,*

*dialing means selectably connectable to a plurality of telephone trunks for placing an outgoing call by dialing one of said telephone numbers on one of said trunks;*

*a plurality of operator stations, each operator station comprising a data terminal for displaying and inputting customer record information and audio communication means, said operator station employing said second protocol for transmitting and receiving data;*

*trunk switching means for selectively connecting a selected one of said trunks to a selected one of said audio communications means;*

*switching means for: (a) coupling said local processor and said host processor to transfer customer record data from said host processor to said local processor; (b) coupling said local processor to each of said data terminals to transfer customer record data from said local processor to each of said data terminals; and (c) coupling each of said data terminals to said host processor to transfer customer record data updates from each of said data terminals to said host processor; and*

*protocol conversion means for changing the protocol of data coupled to said host processor from said second to said first protocol and data coupled from said host processor from said first to said second protocol.*

* * * * *